(12) United States Patent
Foster et al.

(10) Patent No.: US 10,821,829 B2
(45) Date of Patent: Nov. 3, 2020

(54) CONTROL INTERFACE ON AN AUTONOMOUS WORK VEHICLE

(71) Applicant: CNH Industrial America LLC, New Holland, PA (US)

(72) Inventors: Christopher Alan Foster, Mohnton, PA (US); Frank Zsigmond Asztalos, Orchard Lake, MI (US); Eric Michael Jacobsthal, Elmhurst, IL (US); Matthew Huenemann, Racine, WI (US); Dwayne St. George Jackson, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 179 days.

(21) Appl. No.: 15/179,494

(22) Filed: Jun. 10, 2016

(65) Prior Publication Data
US 2017/0355264 A1 Dec. 14, 2017

(51) Int. Cl.
*B60K 35/00* (2006.01)
*B60K 37/06* (2006.01)
*G05D 1/00* (2006.01)
*G05D 1/02* (2020.01)
*A01B 69/00* (2006.01)
(Continued)

(52) U.S. Cl.
CPC .............. *B60K 35/00* (2013.01); *A01B 69/00* (2013.01); *A01C 21/005* (2013.01); *B60K 37/06* (2013.01); *G05D 1/0011* (2013.01); *G05D 1/0016* (2013.01); *G05D 1/0055* (2013.01); *G05D 1/027* (2013.01); *G05D 1/0212* (2013.01); *G05D 1/0274* (2013.01); *G05D 1/0278* (2013.01); *A01B 69/008* (2013.01); *A01C 21/002* (2013.01); *B60K 2370/1438* (2019.05); *B60K 2370/175* (2019.05); *B60K 2370/55* (2019.05); *B60K 2370/682* (2019.05); *B60K 2370/797* (2019.05); *G05D 2201/0201* (2013.01)

(58) Field of Classification Search
CPC ............ B60K 35/00; B60K 2350/1028; B60K 37/06; B60K 2370/55; B60K 2370/797; B60K 2370/682; B60K 2370/175; B60K 2370/1438; A01C 21/005; A01C 21/002; G05D 1/0055; G05D 1/027; G05D 1/0278; G05D 1/0011; G05D 2201/0201; G05D 1/0016; G05D 1/0212; G05D 1/0274; A01B 69/00; A01B 69/008
See application file for complete search history.

(56) References Cited

U.S. PATENT DOCUMENTS

| | | | |
|---|---|---|---|
| 2001/0040503 A1* | 11/2001 | Bishop | B60R 25/04 340/426.11 |
| 2005/0198799 A1 | 9/2005 | Jung et al. | |
| 2006/0070660 A1 | 4/2006 | Swarts | |

(Continued)

*Primary Examiner* — Christian Chace
*Assistant Examiner* — Jordan S Fei
(74) *Attorney, Agent, or Firm* — Rebecca L. Henkel; Rickard K. DeMille

(57) ABSTRACT

In one embodiment, an autonomous vehicle includes a controller and a control interface disposed in an enclosure on the side of the autonomous vehicle. The control interface includes a display communicatively coupled to the controller. The display is used to at least setup or control operation of an implement attached to the autonomous vehicle, setup or control operation of the autonomous vehicle, or both.

20 Claims, 3 Drawing Sheets

(51) Int. Cl.
*A01C 21/00* (2006.01)
*A01B 69/04* (2006.01)

(56) References Cited

U.S. PATENT DOCUMENTS

| | | |
|---|---|---|
| 2006/0175902 A1 | 8/2006 | Matsubara |
| 2007/0182215 A1 | 8/2007 | Rose et al. |
| 2008/0048099 A1 | 2/2008 | Nagai et al. |
| 2008/0173740 A1* | 7/2008 | Parker ................ E01C 23/088 241/33 |
| 2009/0117957 A1 | 5/2009 | Araki et al. |
| 2009/0251868 A1 | 10/2009 | Strohmaier et al. |
| 2010/0094481 A1* | 4/2010 | Anderson ........... G05D 1/0295 701/1 |
| 2011/0162636 A1 | 7/2011 | Gallo |
| 2011/0197844 A1* | 8/2011 | Matsubara ............. B60R 25/00 123/179.2 |
| 2011/0205041 A1* | 8/2011 | Totani .................... B60R 25/00 340/426.1 |
| 2015/0001870 A1* | 1/2015 | Parcher ................. B60K 35/00 296/1.07 |
| 2015/0161932 A1 | 6/2015 | Kure et al. |
| 2015/0296707 A1 | 10/2015 | Fukuda et al. |
| 2015/0319913 A1 | 11/2015 | Foster et al. |
| 2016/0030277 A1 | 2/2016 | Lee et al. |
| 2016/0264021 A1 | 9/2016 | Gillett |
| 2017/0234596 A1* | 8/2017 | Patsis ................. B67D 3/0061 220/592.2 |
| 2017/0355252 A1 | 12/2017 | Jackson |

* cited by examiner

CONTROL INTERFACE ON AN AUTONOMOUS WORK VEHICLE

BACKGROUND

The invention relates generally to work vehicles, and specifically, to control interfaces on autonomous work vehicles.

Work equipment, such as agricultural vehicles (e.g., tractors) and implements (e.g., tillers, seeders, etc.), may be used to perform tasks at work sites, such as in an agricultural operation (e.g., farm). The work vehicles may be capable of manned and/or unmanned (e.g., autonomous) operation. For example, some work vehicles may only be capable of manned operation, while others may be capable of manned or autonomous operation. Typically, work vehicles that are manned by an operator include a control interface that is disposed within an operator station on top of the vehicles. The operator interacts directly with the control interface to control operation of the vehicle and/or the implement. However, locating the control interface on top of a vehicle capable of autonomous operation may be inconvenient for an operator who is not physically riding the vehicle during autonomous operation. For example, the operator may have to climb on top of a stopped autonomous agricultural vehicle to interact with the control interface. Further, the operator may have to climb down from the top of the autonomous vehicle after the change is input into the control interface before starting the vehicle again. Such activity may be inconvenient for operators using autonomous vehicles in their work operation.

BRIEF DESCRIPTION

In one embodiment, an autonomous vehicle includes a controller and a control interface disposed in an enclosure of the autonomous vehicle. The control interface includes a display communicatively coupled to the controller. The display is used to at least setup or control operation of an implement attached to the autonomous vehicle, setup or control operation of the autonomous vehicle, or both.

In one embodiment, a work vehicle system includes an implement attached to an autonomous vehicle. The autonomous vehicle includes a controller, a control interface disposed in an enclosure of the autonomous vehicle. The control interface includes a display communicatively coupled to the controller. The display is used to at least setup or control operation of the implement, setup or control operation of the autonomous vehicle, or both.

In one embodiment, an autonomous vehicle includes a control interface that includes a display and a first ignition switch. The autonomous vehicle also includes a second ignition switch. The first ignition switch and the second ignition switch are used in cooperation to control operation of the autonomous vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
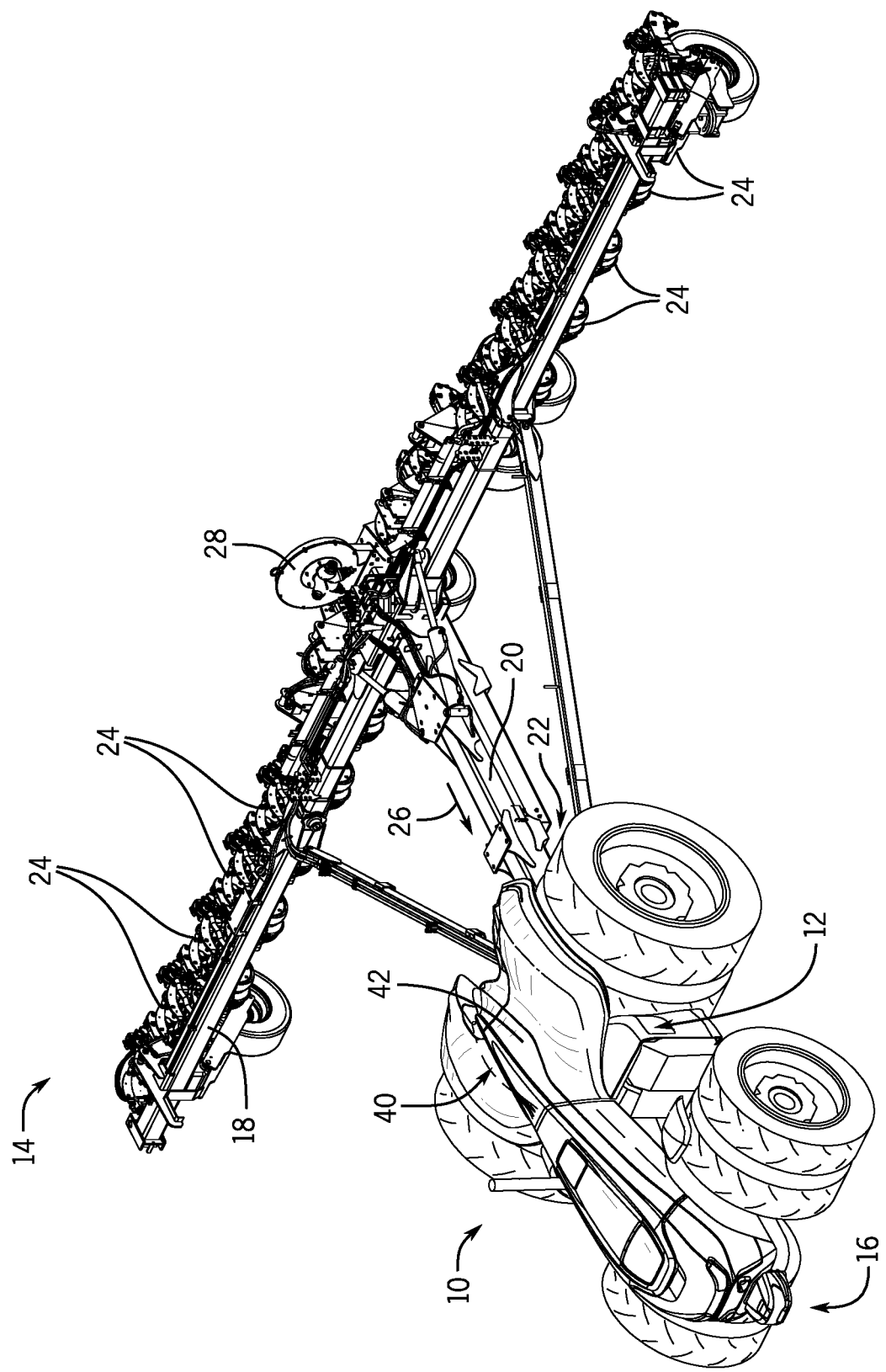
FIG. 1 is a perspective view of an embodiment of an autonomous vehicle including a side-mounted control interface and an attached implement, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Some embodiments of the present disclosure relate to providing a more conveniently located and readily accessible control interface for autonomous vehicles that are capable of either autonomous or manual operation. As discussed above, some control interfaces in vehicles may be located on top of the vehicle in an operator station. Such a location may prove to be inconvenient to access in vehicles that operate autonomously where the operator does not typically ride in the operator station of the vehicle during operation because the operator has to climb into the operator station to access the control interface and climb off of the vehicle before starting the vehicle again. To inhibit climbing into and out of the operator station when the user desires to use the control interface, some embodiments may include mounting or disposing the control interface on a side of the autonomous vehicle. This side-mounted control interface may enable the operator to interact with the control interface while standing on the ground next to the autonomous vehicle. Further, in some embodiments, the control interface may be located at approximately eye level relative to an average height of a person. This may reduce the chance that the operator has to bend over to view a display of the control interface or strain his or her neck to look up at the display.

Moreover, in some embodiments, the control interface may include a display (e.g., touch screen) that provides functionality to control operation of the autonomous work vehicle and/or an implement attached to the autonomous vehicle, as well as display information (e.g., fuel level, tire pressure, oil temperature, agricultural particulate prescription map, distribution schedule of the agricultural particulate, etc.) of the vehicle and/or the implement. The control interface may also include an ignition switch that has to be in an ON position, along with another ignition switch in a hybrid operator station of the vehicle being in an ON position, for the autonomous vehicle to be operable (e.g., power on and operate). The control interface may also include a battery disconnect switch, a data transfer port (e.g., universal serial bus (USB) port), a stop button, and/or an autonomous/manual switch. The ease at which the operator is able to access the control interface may enhance operability of the autonomous vehicle and/or the implement by providing a more convenient experience to the operator.

It should be noted that the techniques disclosed may be used on any desired type of vehicle, but are particularly useful for work vehicles. More particularly, one presently contemplated application is in the area of agricultural work operations, such as on farms, in fields, in operations entailed in preparing, cultivating, harvesting and working plants and fields, and so forth. While in the present disclosure reference may be made to the vehicle 10 as an "agricultural vehicle", it should be borne in mind that this is only one particular area of applicability of the technology, and the disclosure should not be understood as limiting it to such applications.

Turning now to FIG. 1, a perspective view of an embodiment of an autonomous agricultural vehicle 10 capable of autonomous or manual operation that includes a side-mounted control interface 12 and an attached implement 14 is depicted, in accordance with an embodiment. The autonomous agricultural vehicle 10 includes a controller configured to automatically guide the autonomous agricultural vehicle 10 through a field (e.g., along a direction of travel 26) to facilitate agricultural operations. Example agricultural operations that the autonomous agricultural vehicle 10 and the implement 14 may perform include planting operations, seeding operations, application operations, tillage operations, harvesting operations, and the like. For example, the controller may automatically guide the agricultural vehicle 10 that pulls the implement 14 along a guidance swath through the field without input from an operator. The controller may also automatically guide the agricultural vehicle 10 around headland turns between segments of the guidance swath. To facilitate control of the autonomous agricultural vehicle, the controller includes a spatial locating device, such as a Global Position System (GPS) receiver, which is configured to output position information to the controller.

In certain embodiments, the controller may also include an inertial measurement unit (IMU) communicatively coupled to the controller and configured to enhance the accuracy of the determined position and/or orientation. For example, the IMU may include one or more accelerometers configured to output signal(s) indicative of acceleration along a longitudinal axis, a lateral axis, a vertical axis, or a combination thereof. In addition, the IMU may include one or more gyroscopes configured to output signal(s) indicative of rotation (e.g., rotational angle, rotational velocity, rotational acceleration, etc.) about the longitudinal axis, the lateral axis, the vertical axis, or a combination thereof. The controller may determine the position and/or orientation of the agricultural vehicle based on the IMU signal(s) while spatial locating signals received by the spatial locating device are insufficient to facilitate position determination (e.g., while an obstruction, such as a tree or building, blocks the spatial locating signals from reaching the spatial locating antennas). In addition, the controller may utilize the IMU signal(s) to enhance the accuracy of the determined position and/or orientation. For example, the controller may combine the IMU signal(s) with the spatial locating data and/or the position determined by the spatial locating device (e.g., via Kalman filtering, least squares fitting, etc.) to determine a more accurate position and/or orientation of the agricultural vehicle (e.g., by compensating for movement of the spatial locating device resulting from pitch and/or roll of the autonomous agricultural vehicle 10 as the vehicle 10 traverses uneven terrain).

In certain embodiments, the IMU and the spatial locating device may be disposed within a common housing. In further embodiments, the IMU and one spatial locating antenna may be disposed within a common housing. For example, each spatial locating antenna housing may include a spatial locating antenna and an IMU. Furthermore, in certain embodiments, a portion of the spatial locating device and one spatial locating antenna may be disposed within a common housing. For example, a first portion of the spatial locating device and the first spatial locating antenna may be disposed within a first housing, and a second portion of the spatial locating device and the second spatial locating antenna may be disposed within a second housing. In certain embodiments, a first IMU may be disposed within the first housing, and a second IMU may be disposed within the second housing.

The autonomous agricultural vehicle 10 may be controlled remotely by an operator in a base station. As such, the autonomous agricultural vehicle 10 may be communicatively coupled to the base station. In some embodiments, operating autonomously may refer to the ability of the autonomous agricultural vehicle 10 to sense its environment and operate without input from the operator, as noted above. Thus, the autonomous agricultural vehicle 10 may include one or more sensors 16 that obtain data (e.g., object proximity, position of the vehicle 10, speed of the vehicle 10, weather, etc.) and provide the data to the controller of the autonomous agricultural vehicle 10. The controller may process the data to determine how to autonomously operate the autonomous agricultural vehicle 10 as desired.

Further, the controller may store an agricultural particulate prescription map (e.g., seeding rate, location of seeding to be disbursed, etc.) to execute to control the implement 14. In some embodiments, the control interface 12 mounted or disposed on the side of the autonomous agricultural vehicle 10 may be used by the operator to conveniently control operation of the implement 14. More specifically, the operator may approach the control interface 12 while standing on the ground and interact with the control interface 12 without climbing on top of a ladder or the autonomous agricultural vehicle 10. This may be particularly beneficial when the autonomous agricultural vehicle 10 is operating autonomously. Although the depicted implement 14 is a planter, it should be understood that any type of agricultural implement may be controlled by the control interface 12.

As depicted, the implement 14 includes a hollow support frame 18, a tow frame 20, a hitch assembly 22, and row units 24. More specifically, one end of the tow frame 20 is connected to the hollow support frame 18 and the other end is connected to the hitch assembly 22, which enables a coupling to the autonomous agricultural vehicle 10. Thus, the implement 14 may be towed along a direction of travel 26 by the autonomous agricultural vehicle 10.

Additionally, as depicted, a plurality of row units 24 is coupled to the hollow support frame 18. Thus, as the autonomous agricultural vehicle 10 tows the implement 14, each of the row units 24 may deposit seeds at a desired depth beneath the soil surface, thereby establishing rows of planted seeds. It should be noted that the number of row units 24 may be adjusted based on a desired number of seed rows. In other words, the implement 14 may be adjusted to include 6, 8, 12, 16, 24, 32, or 36 row units, or more.

Furthermore, the spacing between row units 24 may be selected based on the type of seed being planting. For example, the row units 24 may be spaced 30 inches from one another when planting corn, and 15 inches from one another when planting soy beans. As such, the number and/or spacing of the row units 24 may be adjusted multiple times during the lifespan of the implement 14.

As described above, the row units 24 may control the planting of seeds. More specifically, each row unit 24 may utilize vacuum pressure to control the seed flow rate and/or the spacing between planted seeds. Accordingly, in the depicted embodiment, a vacuum source 28 is mounted on the support frame 18. In the depicted embodiment, the implement 14 utilizes a single centralized vacuum source. Additionally or alternatively, multiple vacuum sources may be used. For example, a first vacuum source may supply vacuum pressure to half of the row units 24, and a second vacuum source may supply vacuum pressure to the other half of the row units 24.

In some embodiments, the vacuum source 28 may be a fan that displaces air to generate vacuum pressure. For example, the vacuum source 28 may expel air from the row units 24 to generate a negative vacuum pressure. Thus, any suitable vacuum source 28 may be utilized, such as a hydraulically driven fan, an electrically drive fan, and so forth. Moreover, embodiments of the fan may include an axial fan, a blower-type fan, a plurality of parallel fans, a plurality of sequential fans, a turbine-type fan, or any combination thereof. To facilitate distributing the vacuum pressure, a conduit or tubing system may be used to pneumatically couple the vacuum source 28 to the hollow frame structure 18.

The control interface 12 mounted or disposed on the side of the autonomous agricultural vehicle 10 may be used to setup and/or control seeding rates and/or vacuum levels of the implement 14, to setup and/or control a subset of configuration values for the autonomous agricultural vehicle 10, to log data related to work performed by the autonomous agricultural vehicle 10 and/or the implement 14 (e.g., portions of field worked, the agricultural particulate levels and distribution), and the like. Further, as described below, the control interface 12 may include a first ignition switch that is connected in series to a second ignition switch disposed within a hybrid operator station 40 of the autonomous agricultural vehicle 10. The hybrid operator station 40 may include a cover 42 that conceals a compartment of the hybrid operator station 40 that includes a foldable chair for an operator to sit in, a steering wheel or steering assembly, and/or the second ignition switch, among other things.

Figure 2:
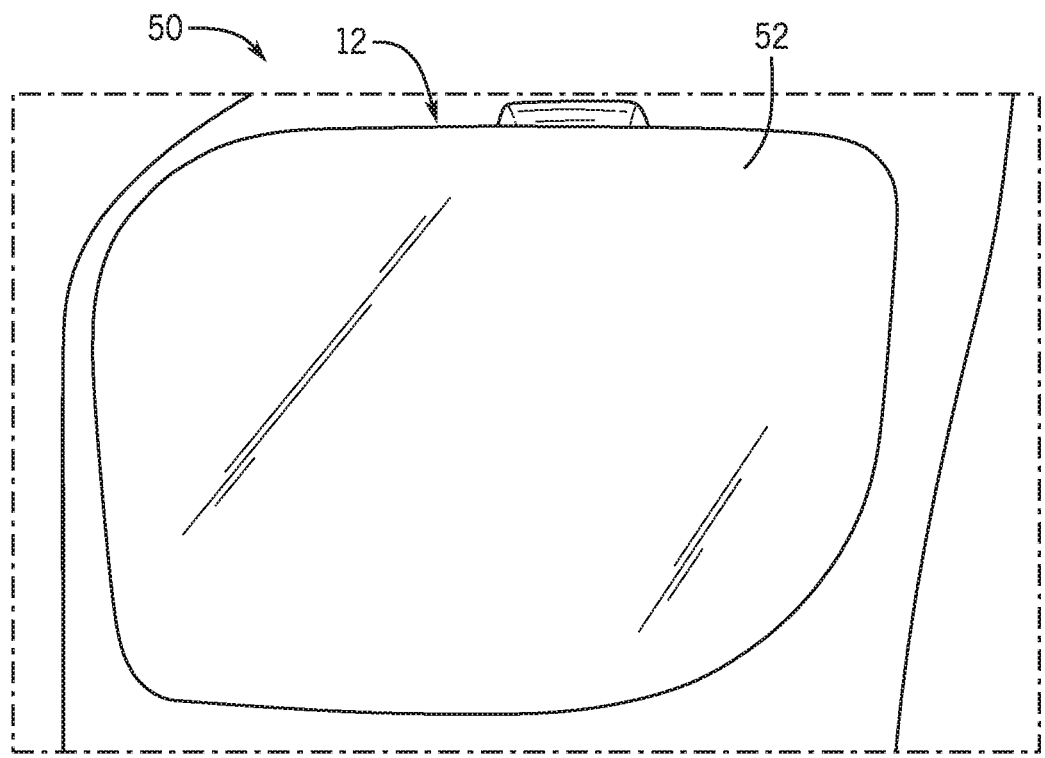
FIG. 2 is a zoomed-in view of a portion of the autonomous vehicle of FIG. 1 including the side-mounted control interface disposed behind a cover panel, in accordance with an embodiment.

FIG. 2 is a zoomed-in view of a portion 50 of the autonomous agricultural vehicle 10 of FIG. 1 including the side-mounted control interface 12 disposed behind a cover panel 52, in accordance with an embodiment. The cover panel 52 may be semi-transparent (e.g., opacity from 0 to 40 percent) to enable an operator to see through the cover panel 52 and view the information displayed on the display of the control interface 12. In some embodiments, the cover panel 52 may be semi-transparent (e.g., not fully transparent) because it may be desirable to block certain light rays from contacting the display of the control interface 12. As such, the cover panel 52 may be tinted or coated with a darkening layer. Further, the cover panel 52 may be durable enough to protect the control interface 12 from the environment and certain objects (e.g., water, hail, rocks, dirt, dust, etc.).

Figure 3:
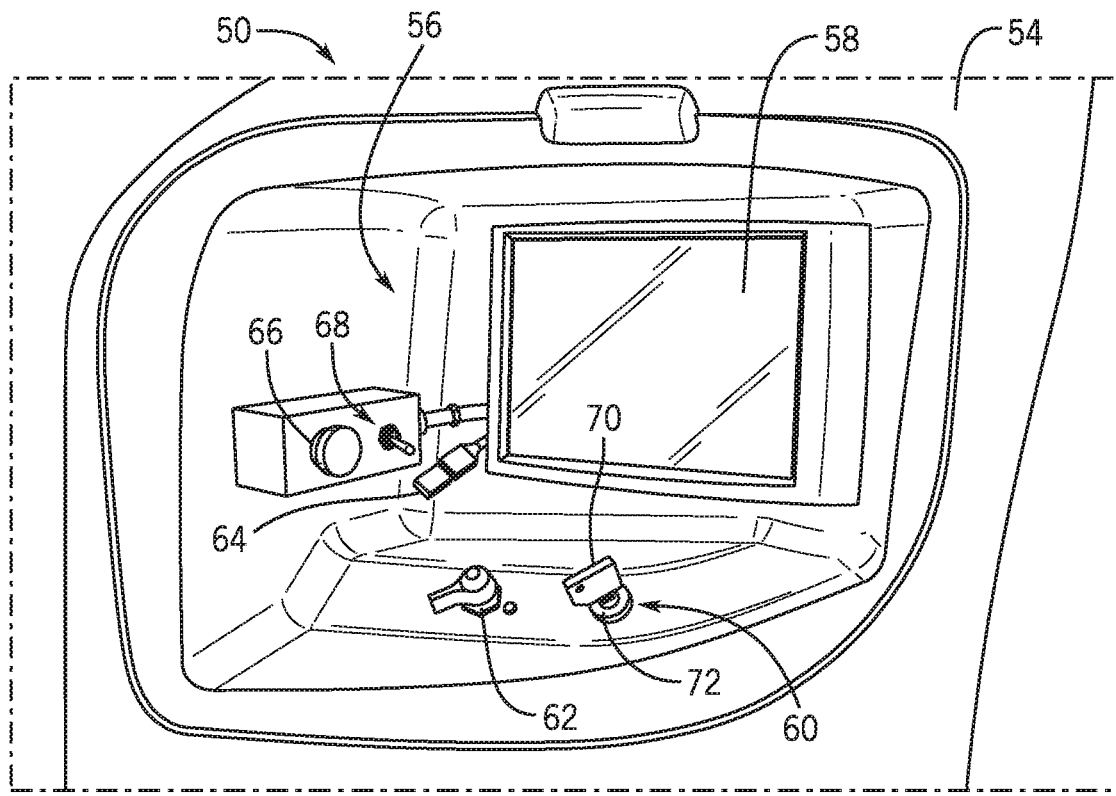
FIG. 3 is a zoomed-in view of the portion of the autonomous vehicle of FIG. 1 including the side-mounted control interface with the cover panel removed, in accordance with an embodiment.

FIG. 3 is a zoomed-in view of the portion 50 of the autonomous agricultural vehicle 10 of FIG. 1 including the side-mounted control interface 12 with the cover panel 52 removed, in accordance with an embodiment. As depicted, removing the cover panel 52 exposes the control interface 12 to enable an operator to access the control interface 12. In some embodiments, the cover panel 52 may be removed by unhinging a clip that secures the cover panel 52 to a side panel 54 of the autonomous agricultural vehicle 10 or pulling on the cover panel 52 to overcome a magnetic force of a magnet on the side panel 54 holding the cover panel 52 in place. The side panel 54 may include an enclosure 56 that includes the control interface 12 and is covered by the cover panel 52 when the cover panel 52 is locked into place on the side panel 54. The control interface 12 may include a display 58, an ignition switch 60, a battery disconnect 62, a data transfer port (e.g., USB port) 64, a stop button 66, and/or an autonomous/manual switch 68.

In some embodiments, the display 58 may include a touch screen display. The display 58 may be a liquid crystal display (LCD), a light-emitting diode (LED) display, a cathode ray tube (CRT), an image projection device, a plasma display, or any other type of display or device capable of presenting an image visible to an operator. In some embodiments, the display 58 may not be touch compatible. Instead, one or more input peripherals, such as buttons, dials, touch pads, keyboards, a mouse, microphones, and the like may be included in the control interface 12 and used to control the display 58. As depicted, the display 58 may be exposed on the side of the autonomous agricultural vehicle 10. As such, an operator may access the control interface 12 including the display 58 by standing next to the control interface 12 including the display 58 without having to climb on top of the autonomous agricultural vehicle 10, which may be particularly beneficial when autonomous operation is enabled. That is, the operator may be standing on the same surface that the autonomous agricultural vehicle 10 is disposed upon when accessing the control interface 12 including the display 58.

As discussed above, the display 58 may be used to setup and/or control the operation of the implement 14 and/or the autonomous agricultural vehicle 10 (e.g., a subset of the configuration values for the autonomous vehicle). As such, the display 58 may display a graphical user interface with various icons, buttons, lists, information, widgets, charts, gauges, graphs, maps, or the like, that may be usable by or informative to the operator. For example, the operator may use the display 58 to configure an agricultural particulate prescription map (e.g., seeding rates, seeding location on the terrain, etc.) and/or a distribution plan (e.g., seeding schedule) of the implement 14. Further, the display 58 may display various information related to the implement 14, such as the vacuum levels of the implement, amount of agricultural particulate, type of agricultural particulate, the particulate prescription map, the distribution plan, implement geometry, and the like. Also, the display 58 may display various information related to the autonomous agricultural vehicle 10, such as configuration values, fuel level, fuel usage, vehicle geometry, vehicle to base station communication, oil pressure, any alerts triggered, whether the ignition switch 60 is in the ON or OFF position, whether the other ignition switch in the hybrid operator station 40 is in the ON or OFF position, an operation plan (e.g., travel route on a digital representation of the terrain, speeds, schedule), a digital representation of the location of the autonomous agricultural vehicle 10 on a map of the terrain, and the like. Additionally, the display 58 may display the software version of the operating system responsible for operating the autonomous agricultural vehicle 10 and/or the graphical user interface displayed on the display 58.

In some embodiments, the ignition switch 60 may include a key 70 and a lock 72. The ignition switch 60 may be wired in series to another ignition switch disposed on top of the autonomous agricultural vehicle 10 (e.g., inside of the hybrid operator station 40). As such, in some embodiments, operating the autonomous agricultural vehicle 10 may dictate that both ignition switches are in an ON position. For example, when the key 70 is inserted into the lock 72 and turned to an ON position and the ignition switch in the hybrid operator station 42 is in the ON position, the autonomous agricultural vehicle 10 may be operable. In some embodiments, a base station may remotely start the autonomous agricultural vehicle 10 when both of the ignition switches are in the ON position. If one of the ignitions switches is in an OFF position, then the autonomous agricultural vehicle 10 may be inoperable. For example, if the key 70 is turned to the OFF position or the ignition switch in the hybrid operator station 40 is turned to the OFF position, the autonomous agricultural vehicle 10 may not be remotely started.

The battery disconnect 62 may disconnect the battery from being used by the autonomous agricultural vehicle 10. The battery disconnect 62 may be used to isolate the battery from the rest of the electrical system. In some embodiments, the battery disconnect 62 may sever the positive connection from the battery. Alternatively, the battery disconnect 62 may sever the negative connection from the battery. As depicted, the battery disconnect 62 may be a physical switch that is manually flipped to disconnect the battery. However, in some embodiments, the battery disconnect 62 may be a soft switch, in that a digital button may be displayed on the display 58 that represents the battery disconnect 62. When the digital button is touched on the screen by the user, the battery disconnect 62 may cause a controller or a mechanism to disconnect the battery.

In some embodiments, the data transfer port 64 may be used to upload or download data to a controller of the autonomous agricultural vehicle 10. The control interface 12 may include the data transfer port 64 with an extension cord or the like to enable convenient access to an operator standing next to the vehicle 10. The operator can connect a jump drive, flash drive, external hard drive, smartphone, computing device, laptop, tablet, or the like, to download data from or upload data to the controller. For example, the operator may download fuel usage, an agricultural particulate prescription map, a distribution schedule of the implement, a travel route of the autonomous agricultural vehicle 10, any alerts that were triggered over a certain time period, and the like. Further, the operator may upload certain data to the controller via the data transfer port 64, such as an agricultural particulate prescription map (e.g., the locations where particulate is to be disbursed and the amount of particulate to disburse), a travel route for the autonomous agricultural vehicle 10, desired fuel usage, schedule of distribution, and the like. It should be understood that the data transfer port 64 may not be limited to the USB protocol. Other serial bus communication protocols (e.g., Ethernet, Profibus, FireWire, etc.) may be used as the port 64 or as one or more additional ports to communicate data over a bus between the controller and a connected device.

In some embodiments, the stop button 66, when pressed, may cause the autonomous agricultural vehicle 10 to stop and power down. The stop button 66 may stop and power down the vehicle 10 when pressed while the vehicle 10 is operating in autonomous or manual mode.

In some embodiments, the autonomous/manual switch 68 may enable the autonomous agricultural vehicle 10 to operate in an autonomous mode or a manual mode. For example, when the autonomous/manual switch 68 is set to autonomous, the autonomous agricultural vehicle 10 may operate autonomously by using stored travel routes, data from the sensors 16, agricultural particulate prescription maps, distribution schedules, or the like. When the autonomous/manual switch 68 is set to manual, the controller may enable the autonomous agricultural vehicle 10 to be operated locally. For example, the controller may ignore commands received from a base station and the hybrid operator station 40 may be converted to enable the operator to sit on top of the autonomous agricultural vehicle 10 to operate the vehicle 10 using a set of operator controls mounted on the vehicle (e.g., a throttle control pedal, brake, transmission control, steering wheel, and so forth).

In some embodiments, the control interface 12 may include a radio transceiver in coupled to a controller of the autonomous agricultural vehicle 10. The radio transceiver may be communicatively coupled to a remote base station to enable the controller to communicate with the remote base station. For example, the remote base station may transmit commands (e.g., operating commands) to the controller via the radio transceiver of the autonomous agricultural vehicle 10. Likewise, the controller may provide status updates or information to the remote base station via the radio transceiver.

Figure 4:
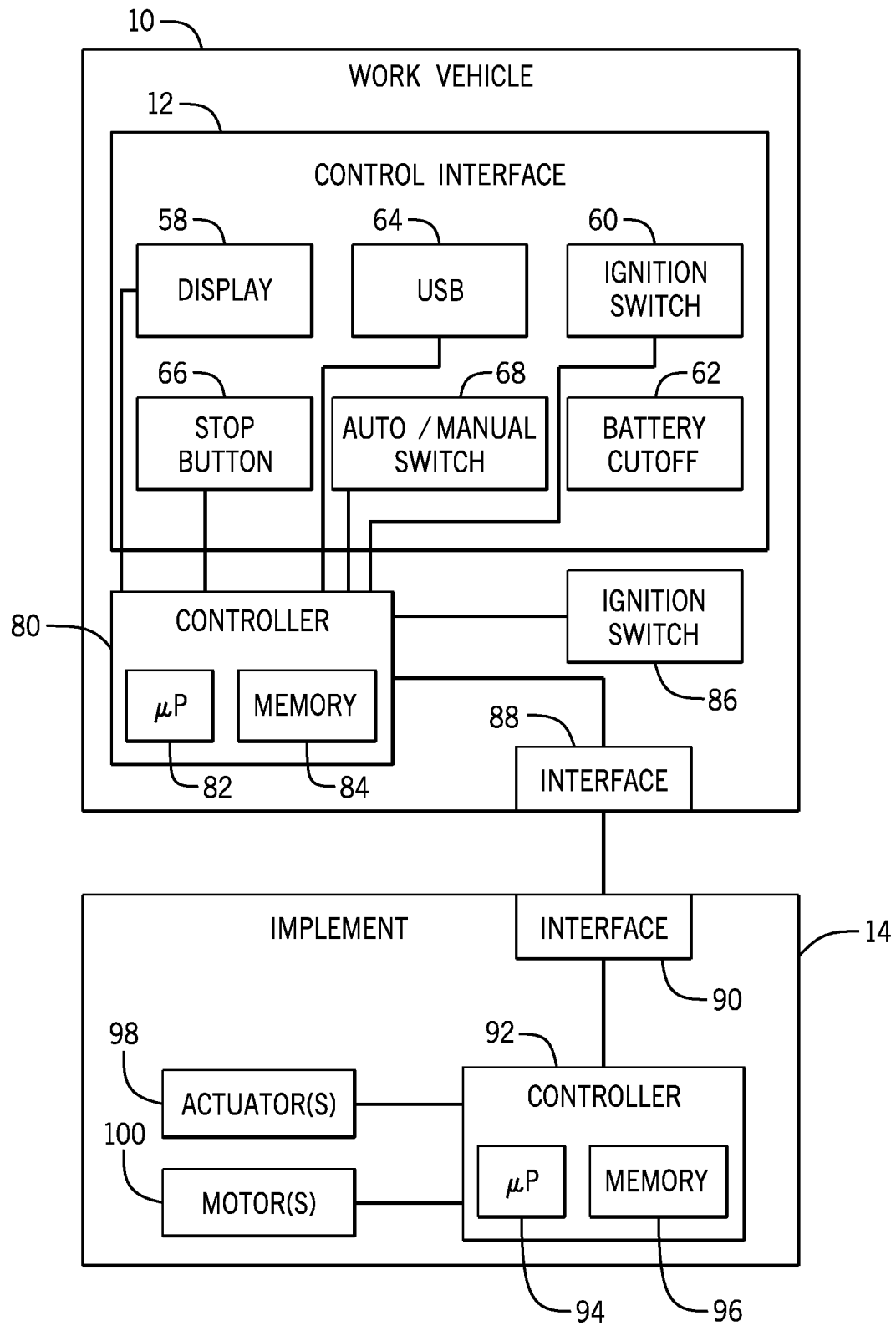
FIG. 4 is a block diagram of example components of the autonomous vehicle and the implement of FIG. 1, in accordance with an embodiment.

With the foregoing in mind, FIG. 4 is a block diagram of example components of the autonomous agricultural vehicle 10 and the implement 14 of FIG. 1, in accordance with an embodiment. It should be noted that the listed components are provided as example components and the embodiments described herein are not to be limited to the components described. As discussed above, the control interface 12 may include the display 58, the ignition switch 60, the battery cutoff 62, the data transfer port 64, the stop button 66, and/or the autonomous/manual switch 68. As depicted, the display 58, the ignition switch 60, the data transfer port 64, the stop button 66, and/or the autonomous/manual switch 68 may be communicatively coupled to a controller 80 of the autonomous agricultural vehicle 10.

The controller 80 may include a processor 82 and a memory 84. The processor 82 may be any type of computer processor or microprocessor capable of executing computer-executable code. Moreover, the processor 82 may include multiple processors or microprocessors, one or more "general-purpose" processors or microprocessors, one or more special-purpose processors or microprocessors, and/or one or more application specific integrated circuits (ASICS), or some combination thereof. For example, the processor 82 may include one or more reduced instruction set (RISC) processors.

The memory 84 may be any suitable articles of manufacture that can serve as media to store processor-executable routines, code, data, or the like. These articles of manufacture may represent non-transitory, computer-readable media (e.g., any suitable form of memory or storage) that may store the processor-executable code or routines used by the respective processor 82 to perform the presently disclosed techniques. For example, the memory 84 may store instructions to execute a graphical user interface displayed on the display 58 to enable the operator to control the autonomous agricultural vehicle 10 (e.g., setup configuration values) and/or the implement 14 (e.g., setup and/or modify an agricultural particulate prescription map and/or a distribution schedule of the implement 14). It should be noted that non-transitory merely indicates that the media is tangible and not a signal. The memory 84 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof. The memory 84 may also be used to store any data (e.g., agricultural particulate prescription map, distribution schedule, travel route, fuel usage, etc.), analysis of the data, the operating system, and the like.

Generally, the processor 82 may execute software applications that include a graphical user interface (GUI) that enables a user to setup and/or control operation of the autonomous agricultural vehicle 10 and/or the implement 14 via the display 58 and to view information related to the autonomous agricultural vehicle 10 and/or the implement 14. Additionally, the processor 82 may execute instructions to power down the autonomous agricultural vehicle 10 when the stop button 66 is pressed. The processor 82 may access data from a device connected via the data transfer port 64 and the data may be uploaded to the memory 84. For example, the data from the data transfer port 64 may include an agricultural particulate prescription map or the like. In some embodiments, the processor 82 may receive an indication when the autonomous/manual switch 68 is set to autonomous mode or manual mode. When the autonomous/manual switch 68 is set to autonomous mode, the processor 82 may control the autonomous agricultural vehicle 10 autonomously using one or more stored prescription maps, distribution schedules, travel routes, data received from the sensors 16, commands received from a remote base station, or the like. When the autonomous/manual switch 68 is set to manual mode, the processor 82 may receive signals from local components (e.g., gas pedal, steering wheel, brake) of the autonomous agricultural vehicle 10 that enable local operation.

Also, the ignition switch 60 may provide an indication to the processor 82 when it is switched to the ON position or the OFF position. Another ignition switch 86 may be disposed on top of the autonomous agricultural vehicle 10 inside of the hybrid operator station 40, as discussed above. The ignition switch 86 may also be communicatively coupled to the controller 80 and provide an indication to the processor 82 when the ignition switch 86 is in the ON position or the OFF position. The processor 82 may determine when the ignition switches 60 and 86 are both in the ON position before enabling operation of the autonomous agricultural vehicle 10. For example, when both ignition switches 60 and 86 are in the ON position, the processor 82 may allow remotely starting or operating the autonomous agricultural vehicle 10, among other things. When one of the ignition switches 60 and 86 are in the OFF position, the processor 82 may render the autonomous agricultural vehicle 10 inoperable. For example, the processor 82 may disable remotely starting or operating the autonomous agricultural vehicle 10, among other things, when one or both of the ignition switches 60 and/or 86 are in the OFF position.

The controller 80 may also be communicatively coupled to a network interface 88. The network interface 88 may enable wireless (e.g., Bluetooth® Low Energy, ZigBee®, WiFi®) or wired (e.g., Ethernet, Controller-Area-Network (CAN)) communication with, for example, the implement 14, a base station, or any desirable computing device. The network interface 88 may be communicatively coupled to a network interface 90 of the implement 14. As such, the controller 80 may send command signals to the implement 14 via the network interfaces 88 and 90, respectively, to control the implement 14. For example, the network interface 90 may receive the command signals from the network interface 88 and send the command signals to a controller 92 of the implement 14. The controller 92 may include a processor 94 and a memory 96. The processor 94 may receive and execute the command signals. In some embodiments, the command signals may control the distribution rate of an agricultural particulate, the distribution schedule (e.g., timing), or the like of the implement 14.

The processor 94 may be any type of computer processor or microprocessor capable of executing computer-executable code. Moreover, the processor 94 may include multiple processors or microprocessors, one or more "general-purpose" processors or microprocessors, one or more special-purpose processors or microprocessors, and/or one or more application specific integrated circuits (ASICS), or some combination thereof. For example, the processor 94 may include one or more reduced instruction set (RISC) processors.

The memory 96 may be any suitable articles of manufacture that can serve as media to store processor-executable routines, code, data, or the like. These articles of manufacture may represent non-transitory, computer-readable media (e.g., any suitable form of memory or storage) that may store the processor-executable code or routines used by the respective processor 94 to perform the presently disclosed techniques. For example, the memory 96 may store instructions to execute an agricultural particulate prescription map, distribution schedule, or the like. It should be noted that non-transitory merely indicates that the media is tangible and not a signal. The memory 96 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof. The memory 96 may also be used to store any data (e.g., agricultural particulate prescription map, distribution schedule, implement configuration, autonomous work vehicle configuration, etc.), analysis of the data, and the like.

Further, the implement may include one or more actuators 98 and one or more motors 100. The actuators 98 and the motors 100 may be communicatively coupled to the controller 92 and controlled via the controller 92. The one or more actuators 98 may be used to lower or raise certain portions of the implement 14, such as the row units 24, to enable a distribution mode and a travel mode, respectively. Further, the motors 100 may be controlled to distribute the agricultural particulate via a metering device or the like. The controller 92 may receive the command signals from the autonomous agricultural vehicle 10 and operate the one or more actuators 98 and/or the motors 100 accordingly.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An autonomous vehicle, comprising:
 a controller;
 a control interface disposed in an enclosure of an exterior side panel of the autonomous vehicle, wherein the control interface comprises a display communicatively coupled to the controller, and the display is used to at least setup or control operation of an implement attached to the autonomous vehicle, setup or control operation of the autonomous vehicle, or both; and a cover panel configured to selectively cover an opening of the enclosure, wherein the control interface is disposed behind the cover panel, and the cover panel is semi-transparent to enable an operator to see through the cover panel to the display;

wherein the control interface includes a first ignition switch used in conjunction with a second ignition switch of the autonomous vehicle to control operation of the autonomous vehicle, and the second ignition switch is disposed in an operator station located on top of the autonomous vehicle.

2. The autonomous vehicle of claim 1, wherein the first and the second ignition switches are electrically coupled in series.

3. The autonomous vehicle of claim 2, wherein both the first and the second ignitions switches have to be set to an ON position for the autonomous vehicle to be operated.

4. The autonomous vehicle of claim 2, wherein both the first and the second ignitions switches have to be set to an ON position for the autonomous vehicle to be remotely started.

5. The autonomous vehicle of claim 1, comprising a battery, wherein the control interface comprises a battery disconnect that severs a positive connection of the battery to isolate the battery.

6. The autonomous vehicle of claim 1, wherein the control interface comprises a data transfer port that is used to upload and/or download data to/from the controller.

7. The autonomous vehicle of claim 6, wherein the data comprises a particulate prescription map, a distribution of particulate schedule, fuel usage, alerts, travel route of the autonomous vehicle, speed of the autonomous vehicle, or some combination thereof.

8. The autonomous vehicle of claim 1, wherein the display at least sets up or controls operation of the implement by receiving input comprising a particulate prescription map for the implement, a distribution schedule of particulate for the implement, or both, and sending the input to the controller to control the implement accordingly.

9. The autonomous vehicle of claim 1, wherein the display comprises a touchscreen.

10. The autonomous vehicle of claim 1, wherein the control interface comprises a stop button communicatively coupled to the controller and configured to cause the autonomous vehicle to stop and power down when pressed.

11. A work vehicle system, comprising:
an implement attached to an autonomous vehicle;
the autonomous vehicle, comprising:
a controller;
a control interface disposed in an enclosure of an exterior side panel of the autonomous vehicle, wherein the control interface is accessible to an operator positioned outside the autonomous vehicle on a side of the autonomous vehicle where the control interface is disposed, the control interface comprises a display communicatively coupled to the controller, and the display is used to at least setup or control operation of the implement, setup or control operation of the autonomous vehicle, or both; and a cover panel configured to selectively cover an opening of the enclosure, wherein the control interface is disposed behind the cover panel, and the cover panel is semi-transparent to enable the operator to see through the cover panel to the display;

wherein the control interface includes a first ignition switch used in conjunction with a second ignition switch of the autonomous vehicle to control operation of the autonomous vehicle, and the second ignition switch is disposed in an operator station located on top of the autonomous vehicle.

12. The work vehicle system of claim 11, wherein the first and the second ignition switches are wired in series and the first and the second ignition switches are required to be in an ON position for the autonomous vehicle to be remotely started.

13. The work vehicle system of claim 11, wherein the control interface comprises a stop button communicatively coupled to the controller and configured to cause the autonomous vehicle to stop and power down when pressed.

14. The work vehicle system of claim 11, wherein the autonomous vehicle comprises a battery, and the control interface comprises a battery disconnect that severs a positive connection of the battery to isolate the battery.

15. An autonomous vehicle, comprising:
a cover panel; and
a control interface disposed behind the cover panel in an enclosure of an exterior side panel of the autonomous vehicle, wherein the control interface comprises:
a display; and
a first ignition switch;
wherein the first ignition switch and a second ignition switch of the autonomous vehicle are used in cooperation to control operation of the autonomous vehicle, and the second ignition switch is disposed in an operator station located on top of the autonomous vehicle;
wherein the control interface is accessible to an operator positioned outside the autonomous vehicle on a side of the autonomous vehicle where the control interface is disposed; and
wherein the cover panel is configured to selectively cover an opening of the enclosure.

16. The autonomous vehicle of claim 15, wherein the display is used to at least setup or control operation of an implement connected to the autonomous vehicle.

17. The autonomous vehicle of claim 15, wherein the first and the second ignition switches are logically coupled such that the autonomous vehicle is prevented from being remotely started when either the first or the second ignition switch is in an OFF position.

18. The autonomous vehicle of claim 15, comprising a battery, wherein the control interface comprises a battery disconnect that severs a positive connection of the battery to isolate the battery.

19. The autonomous vehicle of claim 15, wherein the control interface comprises a stop button configured to cause the autonomous vehicle to stop and power down when pressed.

20. The autonomous vehicle of claim 15, wherein the cover panel is semi-transparent to enable the operator to see through the cover panel to the display.

* * * * *